United States Patent
Pechtold (10) Patent No.: US 8,523,144 B2
(45) Date of Patent: Sep. 3, 2013

(54) VALVE WITH ELASTICALLY DEFORMABLE COMPONENT

(75) Inventor: Rainer Pechtold, Huenstetten (DE)

(73) Assignee: GM Global Technology Operations LLC, Detroit, MI (US)

( * ) Notice: Subject to any disclaimer, the term of this patent is extended or adjusted under 35 U.S.C. 154(b) by 1141 days.

(21) Appl. No.: 11/874,289

(22) Filed: Oct. 18, 2007

(65) Prior Publication Data

US 2009/0101858 A1 Apr. 23, 2009

(51) Int. Cl.
*F16K 25/00* (2006.01)

(52) U.S. Cl.
USPC .............. 251/176; 251/332; 251/334

(58) Field of Classification Search
USPC .......... 251/357, 175, 176, 332–334
See application file for complete search history.

(56) References Cited

U.S. PATENT DOCUMENTS

| | | | | |
|---|---|---|---|---|
| 1,563,385 A | * | 12/1925 | McClymont et al. | 251/357 |
| 2,114,789 A | * | 4/1938 | Urquhart | 251/175 |
| 2,573,623 A | * | 10/1951 | Stover | 251/85 |
| 2,713,989 A | * | 7/1955 | Bryant | 251/333 |
| 3,076,631 A | * | 2/1963 | Grove | 251/173 |
| 3,194,268 A | * | 7/1965 | Vicenzi et al. | 137/614.11 |
| 3,199,833 A | * | 8/1965 | Skinner, Sr. | 251/176 |
| 3,310,277 A | * | 3/1967 | Nielsen et al. | 251/358 |
| 3,422,840 A | * | 1/1969 | Brumm et al. | 137/384 |
| 3,642,248 A | * | 2/1972 | Benware | 251/172 |
| 3,721,424 A | * | 3/1973 | Vanderlinden | 251/144 |
| 3,905,577 A | * | 9/1975 | Karpenko | 251/357 |
| 4,362,184 A | * | 12/1982 | Marabeas | 137/516.29 |
| 4,421,298 A | * | 12/1983 | Kujawski | 251/368 |
| 4,475,711 A | * | 10/1984 | Rountry | 251/85 |
| 4,848,729 A | * | 7/1989 | Danzy | 251/332 |
| 5,368,060 A | * | 11/1994 | Worrall et al. | 137/15.18 |
| 5,535,986 A | * | 7/1996 | Hutchens et al. | 251/306 |
| 5,996,966 A | * | 12/1999 | Zimmerly | 251/357 |
| 6,641,141 B2 | * | 11/2003 | Schroeder | 277/552 |
| 6,698,719 B2 | * | 3/2004 | Geiser | 251/332 |
| 6,811,140 B1 | * | 11/2004 | Maini | 251/264 |
| 6,892,999 B2 | * | 5/2005 | Hall et al. | 251/149.5 |
| 7,357,151 B2 | * | 4/2008 | Lonnes | 137/509 |
| 2003/0052297 A1 | * | 3/2003 | Enzaki et al. | 251/334 |
| 2005/0109974 A1 | * | 5/2005 | Antunes Guimaraes et al. | 251/357 |
| 2005/0151102 A1 | * | 7/2005 | Brinks et al. | 251/129.11 |
| 2005/0189509 A1 | * | 9/2005 | Peric | 251/129.15 |
| 2006/0102866 A1 | * | 5/2006 | Yamagishi | 251/333 |

FOREIGN PATENT DOCUMENTS

WO WO 2005/028931 * 3/2005

OTHER PUBLICATIONS

Federunterstützte Nutringe, OmniSeal, Saint-Gobain Performance Plastics; Dichtungen für $H_2$ Tanksystem.

* cited by examiner

*Primary Examiner* — John Bastianelli
(74) *Attorney, Agent, or Firm* — Fraser Clemens Martin & Miller LLC; J. Douglas Miller (57) ABSTRACT

A valve including an elastically deformable component is disclosed, wherein the elastically deformable component is disposed in one of a valve head and a valve body, and wherein the elastically deformable component is elastically deformed when the valve is in a closed position to facilitate a substantially fluid tight seal between the valve head and the valve body.

10 Claims, 5 Drawing Sheets

VALVE WITH ELASTICALLY DEFORMABLE COMPONENT

FIELD OF THE INVENTION

The invention relates generally to a valve and more particularly to a valve that includes an elastically deformable component disposed in at least one of a valve head and a valve body, wherein the elastically deformable component is elastically deformed when the valve is in a closed position to facilitate a substantially fluid tight seal between the valve head and the valve body.

BACKGROUND OF THE INVENTION

A fuel cell system is increasingly being used as a power source in a wide variety of applications. Fuel cell systems have been proposed for use in power consumers such as vehicles as a replacement for internal combustion engines, for example. Such a fuel cell system is disclosed in commonly owned U.S. patent application Ser. No. 10/418,536, hereby incorporated herein by reference in its entirety. A fuel cell may also be used as a stationary electric power plant in buildings, and as a portable power source in a camera, a computer, and the like. Typically, the fuel cell generates electricity used to charge batteries, or to provide power for an electric motor.

Fuel cells are electrochemical devices which directly combine a fuel such as hydrogen, and an oxidant such as oxygen, to produce electricity. The hydrogen is typically supplied by a fuel source such as a hydrogen tank, for example. The oxygen is typically supplied by an air stream.

The basic process employed by a fuel cell is efficient, substantially pollution-free, quiet, free from moving parts (other than an air compressor, cooling fans, pumps and actuators), and may be constructed to yield only heat and water as by-products. The term "fuel cell" is typically used to refer to either a single cell or a plurality of cells, depending upon the context in which it is used. The plurality of cells is typically bundled together and arranged to form a stack, with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion mediums (hereinafter "DM's") or diffusion layers that are formed from a resilient, conductive, and gas permeable material such as carbon fabric or paper, for example. The DM's serve as the primary current collectors for the anode and cathode as well as provide mechanical support for the MEA. The DM's and MEA are pressed between a pair of electrically conductive plates which serve as secondary current collectors for collecting the current from the primary current collectors. The plates conduct current between adjacent cells internally of the stack in the case of bipolar plates, and conduct current externally of the stack in the case of monopolar plates at the end of the stack.

A valve is typically used to selectively permit and militate against the flow of a fluid therethrough. In the fuel cell system, a flow of a hydrogen gas from a source of hydrogen gas to the fuel cell stack is controlled, for example. The valve typically includes a valve head and a valve body. The valve head and the valve body are normally formed from different materials, one material being harder than the other. When the valve is in a closed position and the valve head abuts the valve body to form a substantially fluid tight seal therebetween, the softer material may be deformed. If this deformation is reversible, it is referred to as elastic deformation. If the deformation is not reversible, it is referred to as plastic deformation. Plastic deformation is undesirable because it may permit leak to develop between the valve head and the valve body.

Prior art valves include softer materials formed from an elastomer, such as ethylene propylene diene monomer rubber or fluoroelastomer, for example. The elastomers are limited to use at temperatures above −40° C. However, in fuel cell applications where hydrogen is used, for example, lower temperatures such as −80° C. can be experienced. Accordingly, elastomers cannot be used. At the lower temperatures, plastic materials such as polyetheretherketone or polytetrafluoroethylene are used. These materials accommodate a certain elastic deformation, which is useful for facilitating the substantially fluid tight seal between the valve head and the valve body. However, use of these materials also creates a possibility for an amount of plastic deformation, which is undesirable.

It would be desirable to produce a valve for use in a fuel cell stack, wherein the valve includes an elastically deformable component that is elastically deformed when the valve is in a closed position, and a plastic deformation of the valve is minimized.

SUMMARY OF THE INVENTION

Harmonious with the present invention, a valve for use in a fuel cell stack, wherein the valve includes an elastically deformable component that is elastically deformed when the valve is in a closed position, and a plastic deformation of the valve is minimized, has surprisingly been discovered.

In one embodiment, the valve comprises a valve head adapted to be disposed in a chamber formed in the valve; a valve body having a valve seat formed thereon adapted to abut at least a portion of the valve head to create a substantially fluid tight seal therebetween; and an elastically deformable component disposed on one of the valve head and the valve body, wherein the elastically deformable component is elastically deformed when the valve seat abuts the portion of the valve head.

In another embodiment, the valve comprises a valve head adapted to be disposed in a chamber formed in the valve; a valve body having a valve seat formed thereon adapted to abut at least a portion of the valve head to create a substantially fluid tight seal therebetween; and at least one elastically deformable component disposed on one of the valve head and the valve body, wherein the elastically deformable component is elastically deformed when the valve is in a closed position and the valve seat abuts the portion of the valve head, and wherein the one of the valve head and the valve body including the elastically deformable component is formed from a material that is softer than a material used to form the other of the valve head and the valve body.

In another embodiment, the valve comprises a valve head adapted to be disposed in a chamber formed in the valve and including a plastic insert; a valve body having a valve seat formed thereon adapted to abut at least a portion of the valve head to create a substantially fluid tight seal therebetween; and at least one elastically deformable component disposed in the plastic insert of the valve head, wherein the elastically deformable component is elastically deformed when the valve is in a closed position and the valve seat abuts the portion of the valve head.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
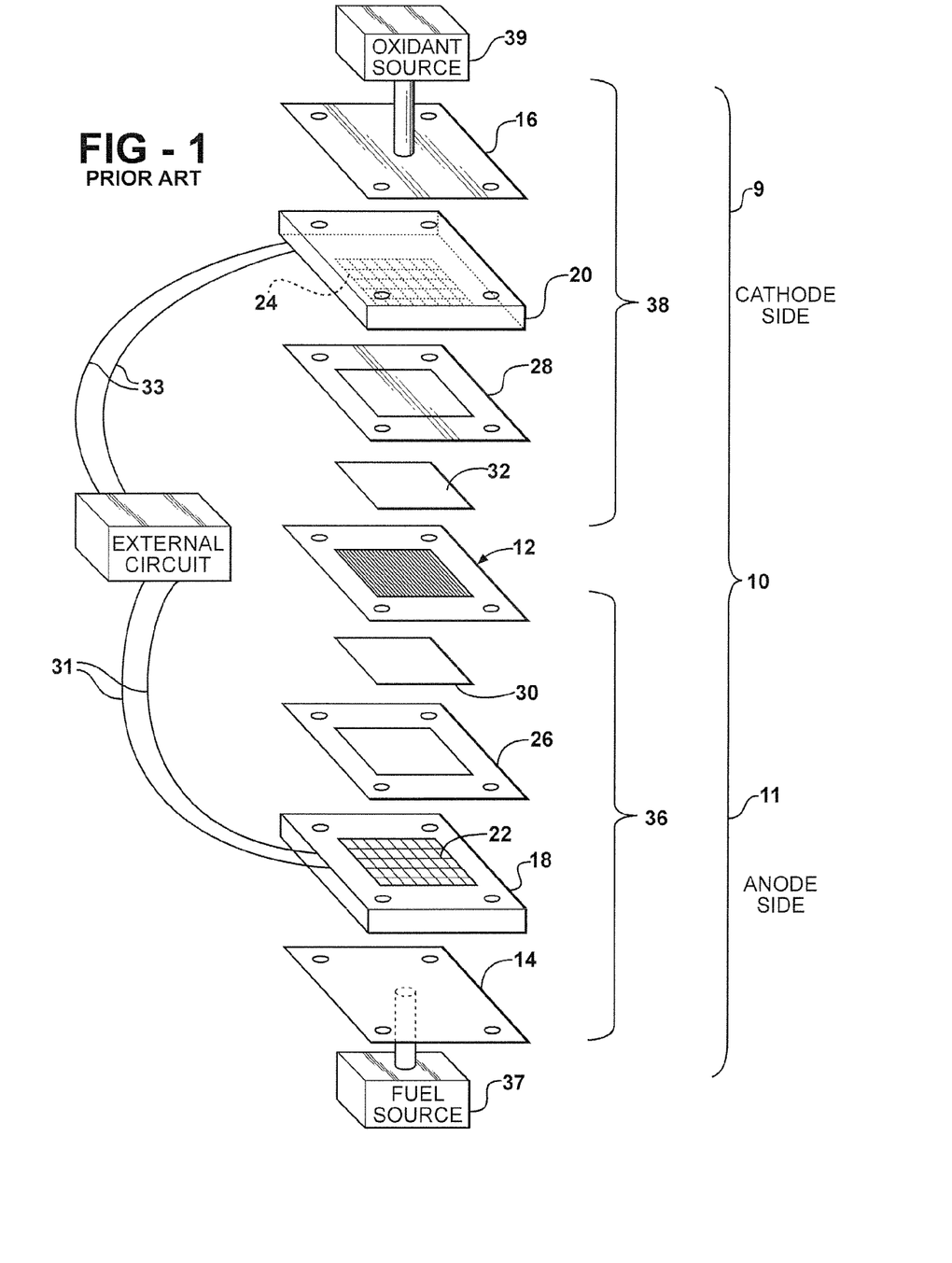
FIG. 1 is an exploded schematic perspective view of a fuel cell system according to the prior art.

FIG. 1 shows a fuel cell system of the prior art. The fuel cell system includes a fuel cell 10 having a cathode side 9 and an anode side 11. The fuel cell 10 is in fluid communication with a fuel source 37 and an oxidant source 39. Graphite blocks 18, 20 having a plurality of channels 22, 24 to facilitate fluid distribution are disposed adjacent the insulation end plates 14, 16. It is understood that electrically conductive electrode plates (not shown) can be used in the place of the graphite blocks 18, 20. Gaskets 26, 28 and gas diffusion media (GDM) 30, 32, such as carbon fiber paper, for example, having respective anode and cathode connections 31, 33, are respectively disposed between a membrane electrode assembly (MEA) 12 and the graphite blocks 18, 20. An oxidant and current transport means 36 is made up of the graphite block 18, the gasket 26, and the GDM 30. A fuel and current transport means 38 is made up of the graphite block 20, the gasket 28, and the GDM 32. The anode connection 31 and the cathode connection 33 are used to interconnect the fuel cell 10 with an external circuit 34, and may include other fuel cells as desired.

A fuel cell stack is constructed of a plurality of fuel cells 10 electrically connected in series. Once a desired number of fuel cells 10 are joined together to form the fuel cell stack, a coolant system (not shown) is provided with the fuel cell stack. The illustrative fuel cell stack described herein is commonly used as a power plant for the generation of electric power in a vehicle, for example.

In use, a fuel such as hydrogen is supplied from the fuel source 37, and an oxidant such as oxygen is supplied from the oxidant source 39. The fuel and the oxidant diffuse through respective fluid and current transport means 36, 38 to opposing sides of the MEA 12. Porous electrodes (not shown) form an anode (not shown) at the anode side 11 and a cathode (not shown) at the cathode side 9, and facilitate a chemical reaction between the fuel and the oxidant in the fuel cell 10.

Figure 2:
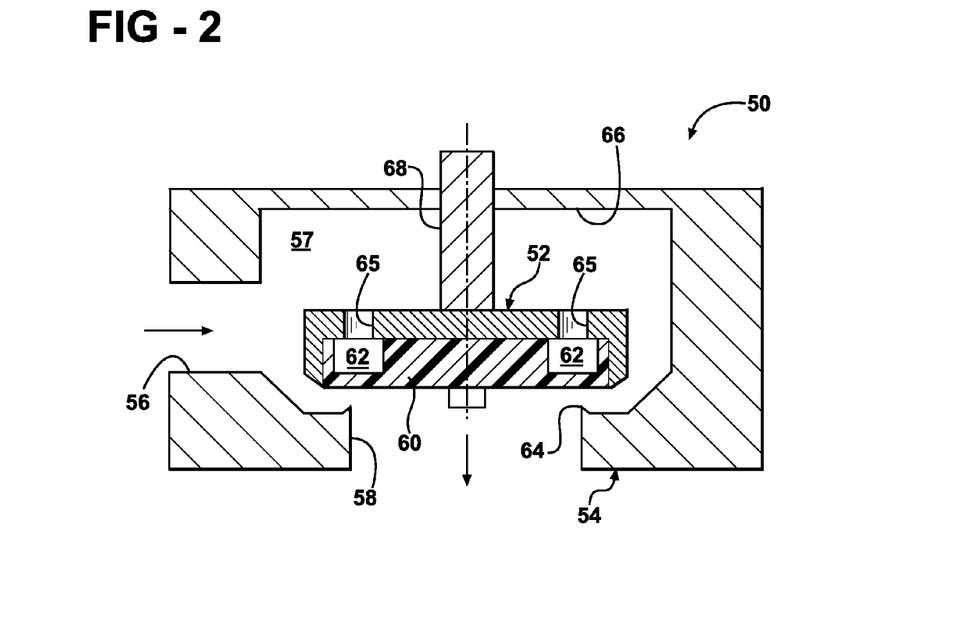
FIG. 2 is a cross-sectional view of a valve shown in an open position in accordance with an embodiment of the invention.
Figure 3:
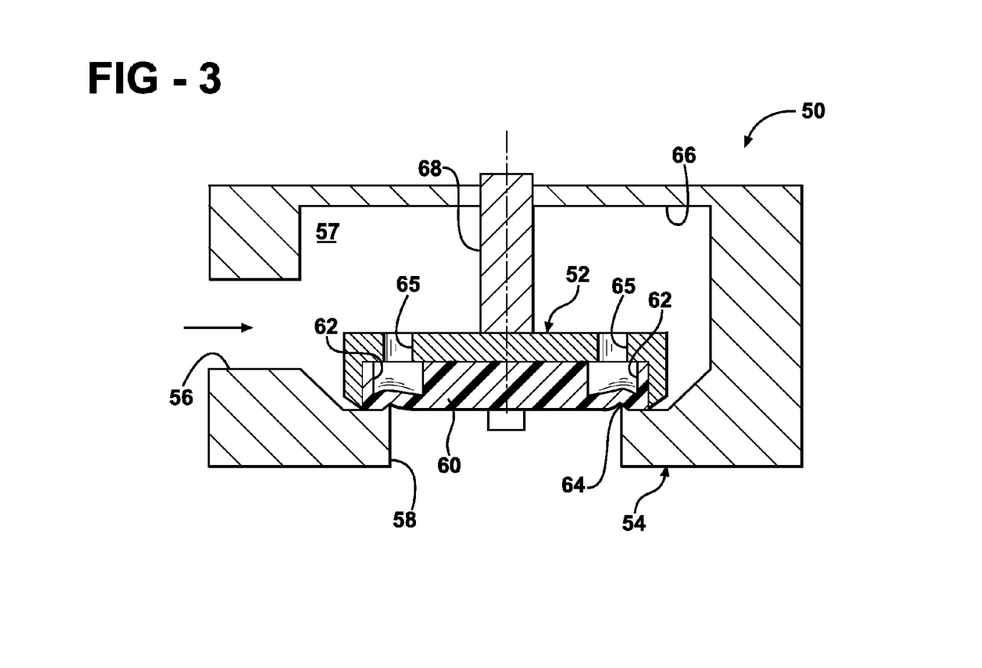
FIG. 3 is a cross-sectional view of the valve illustrated in FIG. 2, with the valve in a closed position.

FIGS. 2 and 3 show a valve 50 according to an embodiment of the invention. The valve 50 includes a valve head 52 and a valve body 54. In the embodiment shown, the valve 50 is a shut off type valve disposed between a fuel source (not shown) and a fuel cell (not shown) as described above for FIG. 1. However, other types of valves can be used and can be disposed in other locations as desired. Other valve types may be a proportional valve, a check valve, and a pressure regulator valve, for example. A flow path is formed in the valve 50 from an inlet port 56 formed in the valve body 54, into a valve chamber 57, through a gap between the valve head 52 and the valve body 54 when the valve 50 is in an open position, and through an outlet port 58 formed in the valve body 54. It is understood that other valve types may provide a flow path different from the exemplary path described herein.

In the embodiment shown, the valve head 52 includes an insert 60 formed from a plastic, which is softer than a material used to form the valve body 54. However, it is understood that the insert 60 can be formed from other materials as desired. It is also understood that the valve head 52 may be formed without the insert 60, wherein the entire valve head 52 is formed from a material softer than the material used to form the valve body 54. The valve head 52 includes an elastically deformable component 62 formed therein. It is understood that additional elastically deformable components 62 can be formed in the valve head 52 as desired, such as an annular array of elastically deformable components 62, for example. In the embodiment shown, the elastically deformable component 62 is a continuous, annular ring with a fluid-filled pressure chamber. However, other types of elastically deformable components can be used as desired. As used herein, the term fluid refers to a liquid, a gas, or any combination thereof. The elastically deformable component 62 is in fluid communication with a plurality of pressure release bores 65 that are formed in the valve head 52. The pressure release bores 65 are in fluid communication with the valve chamber 57. It is understood that additional or fewer pressure release bores 65 may be formed in the valve head 52 as desired. The valve head 52 is operably connected to an actuator (not shown) which selectively positions the valve head 52 in an open position as illustrated in FIG. 2 and a closed position as illustrated in FIG. 3.

The valve body 54 is formed from a material that is harder than the material used to form the insert 60 such as aluminum, for example. The valve body 54 includes an annular lip 64, also known as a valve seat, which surrounds the outlet port 58. The lip 64 is adapted to abut the insert 60 when the valve 50 is in a closed position to create a substantially fluid tight seal therebetween.

A sealing member 66 is formed with the valve body 54 and cooperates with the valve body 54 to form the valve chamber 57. The sealing member 66 shown is formed integrally with the valve body 54, but may also be formed as a separate component without departing from the scope and spirit of the invention. A valve stem 68 disposed between the valve head 52 and the actuator extends through an aperture formed in the sealing member 66. It is understood that the valve stem 68 may be slidingly disposed in the aperture formed in the sealing member 66 if the sealing member 66 is stationary in respect of the valve body 54, or the valve stem 68 may be affixed to the sealing member 66 if the sealing member 66 is slidably received by the valve body 54. When the sealing member 66 is slidably received by the valve body 54, the sealing member 66, the valve stem 68, and the valve head 52 all move together as a unit. It is further understood that other actuator types may be used which eliminate the need for the sealing member 66.

In use, when a flow of a fluid through the valve 50 is desired, the actuator positions the valve head 52 in an open position as illustrated in FIG. 2. It is understood that the actuator can position the valve 50 in an open position by other means as desired, such as by adjusting the position of the valve body 54, for example. When the valve head 52 is in an open position, the fluid is permitted to flow into the inlet port 56, through the gap between the valve head 52 and the valve body 54, and out of the outlet port 58.

When it is desired to militate against the flow of the fluid through the valve 50, the actuator positions the valve head 52 in a closed position as illustrated in FIG. 3. When the valve head 52 is in a closed position, the insert 60 abuts the lip 64 formed on the valve body 54 to close the gap between the valve head 52 and the valve body 54. Accordingly, the flow of the fluid is militated against. A force is exerted on the valve head 52 by the lip 64, which causes the elastically deformable component 62 to deform. When the elastically deformable component 62 is deformed, fluid present in the deformable component 62 is caused to flow through the pressure release bores 65 into the valve chamber 57. When the valve head 52 is moved back into an open position, the force exerted on the valve head 52 is released, and the elastically deformable component 62 returns to its original shape and position. The fluid is permitted to flow back into the elastically deformable component 62 through the pressure release bores 65. A pressure exerted by the fluid on the deformable component 62 in the pressure release bores 65 when the valve head 52 is in the closed position militates against a plastic deformation of the insert 60.

While the elastically deformable component 62 has been shown as being formed in the valve head 52, the elastically deformable component 62 may be formed in the valve body 54 without departing from the spirit and scope of the invention. It is understood that if the elastically deformable component 62 is formed in the valve body 54 rather than in the valve head 52, the valve body 54 would be formed from a material that is softer than the material used to form the valve head 52.

Figure 4:
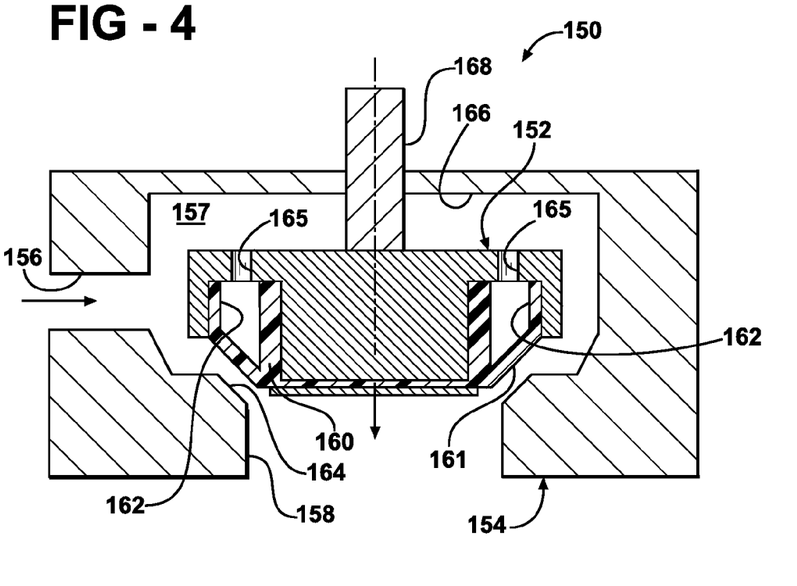
FIG. 4 is a cross-sectional view of a valve shown in an open position in accordance with another embodiment of the invention.
Figure 5:
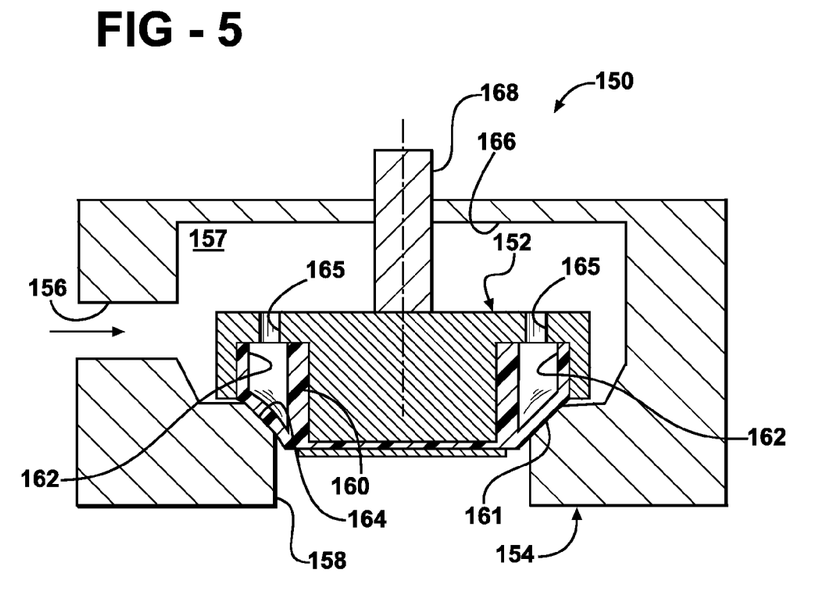
FIG. 5 is a cross-sectional view of the valve illustrated in FIG. 4, with the valve in a closed position.

FIGS. 4 and 5 show a valve 150 according to another embodiment of the invention. The valve 150 includes a valve head 152 and a valve body 154. In the embodiment shown, the valve 150 is a shut off type valve disposed between a fuel source (not shown) and a fuel cell (not shown) as described above for FIG. 1. However, other types of valves can be used and the valve can be disposed in other locations as desired. A flow path is formed in the valve 150 from an inlet port 156 formed in the valve body 154, into a valve chamber 157, through a gap between the valve head 152 and the valve body 154 when the valve 150 is in an open position, and through an outlet port 158 formed in the valve body 154.

In the embodiment shown, the valve head 152 includes an insert 160 formed from a plastic which is softer than a material used to form the valve body 154. However, it is understood that the insert 160 can be formed from other materials as desired. It is also understood that the valve head can be formed without the insert 160, wherein the entire valve head 152 may be formed from a material which is softer than the material used to form the valve body 154. The valve head 152 includes an elastically deformable component 162 formed therein. It is understood that additional elastically deformable components 162 can be formed in the valve head 152 as desired such as an annular array of elastically deformable components 162, for example. In the embodiment shown, the elastically deformable component 162 is a continuous, annular ring with a fluid-filled pressure chamber. However, other types of elastically deformable components can be used as desired. The elastically deformable component 162 is in fluid communication with a plurality of pressure release bores 165 formed in the valve head 152. The pressure release bores 165 are in fluid communication with the valve chamber 157. It is understood that additional or fewer pressure release bores 165 may be formed in the valve head 152 as desired. The valve head 152 includes an annular tapered surface 161 that is adapted to abut the valve body 154. The valve head 152 is operably connected to an actuator (not shown) which selectively positions the valve head 152 in an open position as illustrated in FIG. 4 and a closed position as illustrated in FIG. 5.

The valve body 154 is formed from a material that is harder than the material used to form the insert 160, such as aluminum, for example. The valve body 154 includes an annular tapered surface 164, also known as a valve seat, surrounding the outlet port 158. The annular tapered surface 164 is adapted to abut the annular tapered surface 161 of the insert 160 when the valve head 152 is in a closed position to create a substantially fluid tight seal therebetween.

A sealing member 166 is formed with the valve body 154 to form the valve chamber 157 therebetween. The sealing member 166 shown is formed integrally with the valve body 154, but can be formed separately, if desired. A valve stem 168 disposed between the valve head 152 and the actuator extends through an aperture formed in the sealing member 166. It is understood that the valve stem 168 may be slidingly disposed in the aperture of the sealing member 166 if the sealing member 166 is stationary in respect of the valve body 154, or the valve stem 168 may be affixed to the sealing member 166 if the sealing member 166 is slidably received by the valve body 154. When the sealing member 166 is slidably received by the valve body 154, the sealing member 166, the valve stem 168, and the valve head 152 all move together as a unit. It is further understood that other actuator types may be used which eliminate the need for the sealing member 166.

In use, when a flow of a fluid through the valve 150 is desired, the actuator positions the valve head 152 in an open position as illustrated in FIG. 4. It is understood that the actuator can position the valve head 152 in an open position by other means as desired, such as by adjusting the position of the valve body 154, for example. When the valve head 152 is in an open position, the fluid is permitted to flow into the inlet port 156, through the gap between the valve head 152 and the valve body 154, and out of the outlet port 158.

When it is desired to militate against the flow of fluid through the valve 150, the actuator positions the valve head 152 in a closed position as illustrated in FIG. 5. It is understood that the actuator can position the valve head 152 in a closed position by other means as desired, such as by adjusting the position of the valve body 154, for example. When the valve head 152 is in a closed position, the tapered surface 161 of the insert 160 abuts the tapered surface 164 of the valve body 154 to close the gap between the valve head 152 and the valve body 154 and the flow of the fluid is militated against. A force is exerted on the valve head 152 by the tapered surface 164 which causes the elastically deformable component 162 to deform. When the elastically deformable component 162 is deformed, fluid is caused to flow out of the elastically deformable component 162 through the pressure release bores 165 and into the valve chamber 157. When the valve head 152 is moved back into an open position, the force exerted on the valve head 152 is released, and the elastically deformable component 162 reverts to its original position and shape. The fluid is permitted to flow back into the elastically deformable component 162 through the pressure release bores 165. A pressure exerted by the fluid on the deformable component 162 in the pressure release bores 165 when the valve head 152 is in the closed position militates against a plastic deformation of the insert 160.

While the elastically deformable component 162 has been shown as being formed in the valve head 152, the elastically deformable component 162 may be formed in the valve body 154 as desired without departing from the spirit and scope of the invention. It is understood that if the elastically deformable component 162 is formed in the valve body 154 rather than in the valve head 152, the valve body 154 would be formed from a material that is softer than the material used to form the valve head 152.

Figure 6:
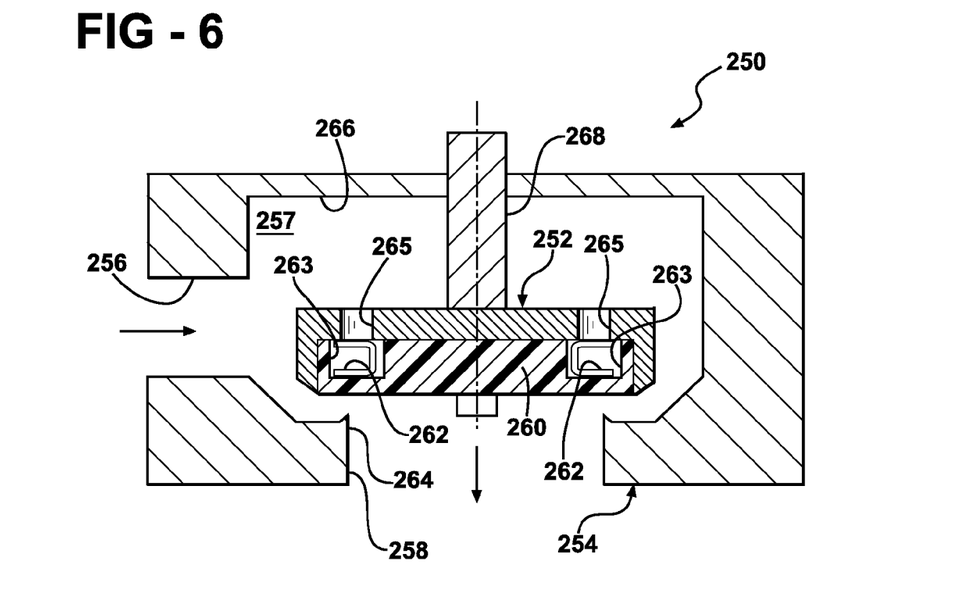
FIG. 6 is a cross-sectional view of a valve shown in an open position in accordance with another embodiment of the invention.
Figure 7:
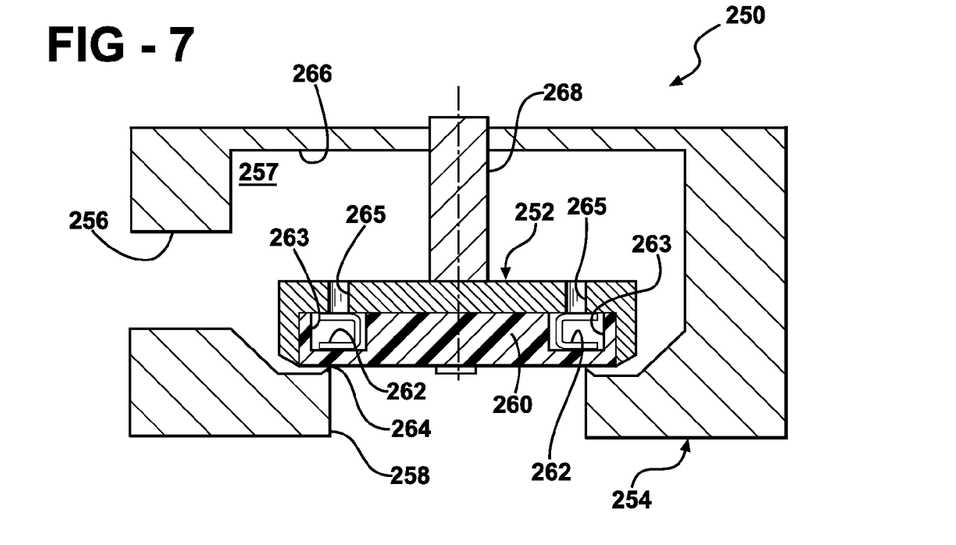
FIG. 7 is a cross-sectional view of the valve illustrated in FIG. 6, with the valve in a closed position.

FIGS. 6 and 7 show a valve 250 according to another embodiment of the invention. The valve 250 includes a valve head 252 and a valve body 254. In the embodiment shown, the valve 250 is a shut off type valve disposed between a fuel source (not shown) and a fuel cell (not shown) as described above for FIG. 1. However, other types of valves can be used and can be disposed in other locations as desired. A flow path is formed in the valve 250 from an inlet port 256 formed in the valve body 254, into a valve chamber 257, through a gap between the valve head 252 and the valve body 254 when the valve head 252 is in an open position, and through an outlet port 258 formed in the valve body 254.

In the embodiment shown, the valve head 252 includes an insert 260 formed from a plastic, which is softer than a material used to form the valve body 254. However, it is understood that the insert 260 can be formed from other materials as desired. It is also understood that the insert 260 may be formed integrally with the valve head 252, wherein the entire valve head 252 may be formed from a material which is softer than the material used to form the valve body 254. The valve head 252 includes an elastically deformable component 262 disposed in an annular cavity 263 formed therein. It is understood that additional elastically deformable components 262 and cavities 263 can be formed in the valve head 252 as desired, such as an annular array of elastically deformable components 252 and cavities 263. It is also understood that a plurality of elastically transformable components 262 may be disposed in lesser number of cavities 263 without departing from the scope and spirit of the invention, such as wherein an annular array of elastically deformable components 262 is disposed in the ring shaped cavities 263, for example. In the embodiment shown, the elastically deformable component 262 is a metal spring. However, other types of elastically deformable components 262 can be used as desired. The cavity 263 is in fluid communication with a plurality of pressure release bores 265 that are formed in the valve head 252. The pressure release bores 265 are in fluid communication with the valve chamber 257. It is understood that additional or fewer pressure release bores 265 may be formed in the valve head 252 as desired. The valve head 252 is operably connected to an actuator (not shown) which selectively positions the valve head 252 in an open position as illustrated in FIG. 6 and a closed position as illustrated in FIG. 7.

The valve body 254 is formed from a material that is harder than the material used to form the insert 260 such as aluminum, for example. The valve body 254 includes an annular lip 264, also known as a valve seat, surrounding the outlet port 258. The lip 264 is adapted to abut the insert 260 when the valve head 252 is in a closed position to create a substantially fluid tight seal therebetween.

A sealing member 266 is formed with the valve body 254 to form the valve chamber 257. The sealing member 266 shown is formed integrally with the valve body 254, but could be formed separately, for example. A valve stem 268 attached to the valve head 252 and the actuator extends through an aperture formed in the sealing member 266. It is understood that the valve stem 268 may be slidingly disposed in the aperture of the sealing member 266 if the sealing member 266 is stationary in respect of the valve body 254. Alternatively, the valve stem 268 may be affixed to the sealing member 266 if the sealing member 266 is slidably received by the valve body 254. When the sealing member 266 is slidably received by the valve body 254, the sealing member 266, the valve stem 268, and the valve head 252 would all move together as a unit. It is further understood that other actuator types may be used which eliminate the need for the sealing member 266.

In use, when a flow of a fluid through the valve 250 is desired, the actuator positions the valve head 252 in an open position as illustrated in FIG. 6. It is understood that the actuator can position the valve 250 in an open position by other means as desired, such as by adjusting the position of the valve body 254, for example. When the valve head 252 is in an open position, the fluid is permitted to flow into the inlet port 256, through the gap between the valve head 252 and the valve body 254, and out of the outlet port 258.

When it is desired to militate against the flow of fluid through the valve 250, the actuator positions the valve head 252 in a closed position as illustrated in FIG. 7. It is understood that the actuator can position the valve head 252 in a closed position by other means as desired, such as by adjusting the position of the valve body 254, for example. When the valve head 252 is in a closed position, insert 260 abuts the lip 264 formed on the valve body 254 to close the gap between the valve head 252 and the valve body 254, and the flow of the fluid through the valve 250 is militated against. A force is exerted on the valve head 252 by the lip 264 which causes the elastically deformable component 262 to deform. When the elastically deformable component 262 is deformed, fluid in the cavity 263 flows out through the pressure release bores 265 and into the valve chamber 257. When the valve head 252 is moved back into an open position, the force exerted on the valve head 252 is released and the elastically deformable component 262 returns to its original position and shape. The fluid is permitted to flow back into the cavity 263 through the pressure release bores 265. A pressure exerted on the insert 260 by the deformable component 262 and the fluid when the valve head 252 is in the closed position militates against a plastic deformation of the insert 260.

While the elastically deformable component 262 has been shown as being disposed in the cavity 263 that is formed in the valve head 252, the elastically deformable component 262 may be disposed in a cavity (not shown) formed in the valve body 254 as desired without departing from the spirit and scope of the invention. It is understood that if the elastically deformable component 262 is disposed in a cavity formed in the valve body 254 rather than in the valve head 252, the valve body 254 would be formed from a material that is softer than the material used to form the valve head 252.

Figure 8:
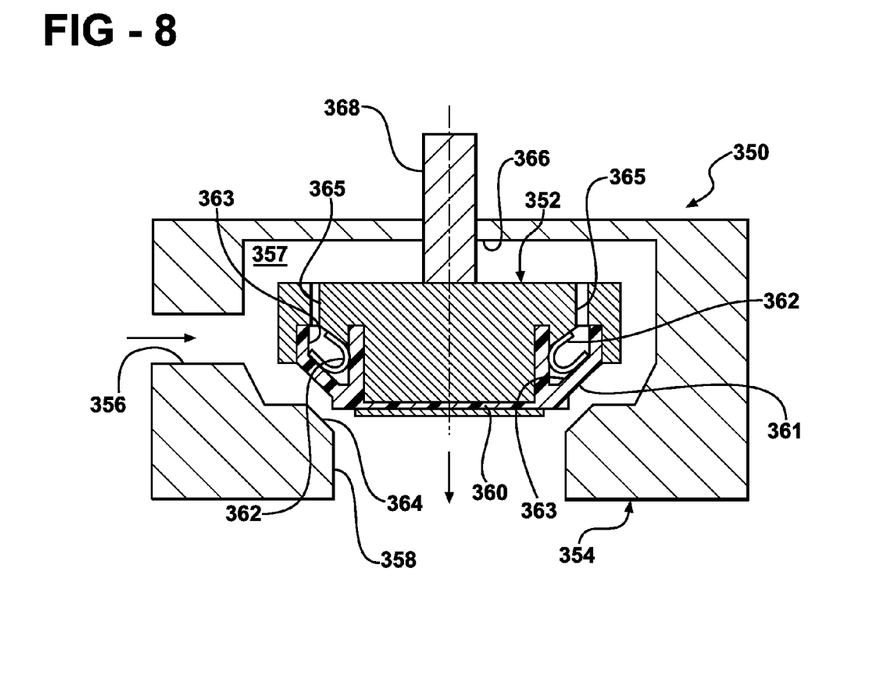
FIG. 8 is a cross-sectional view of a valve shown in an open position in accordance with another embodiment of the invention.
Figure 9:
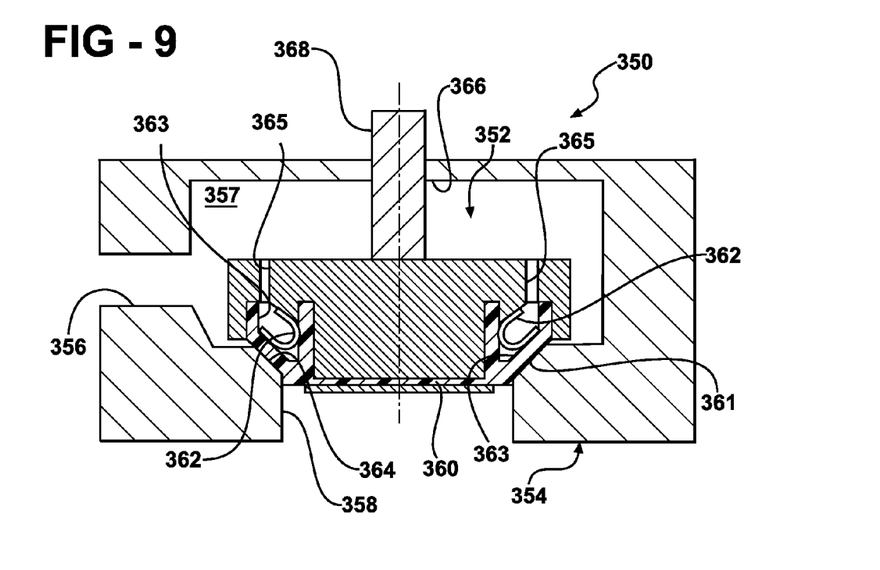
FIG. 9 is a cross-sectional view of the valve illustrated in FIG. 8, with the valve in a closed position.

FIGS. 8 and 9 show a valve 350 according to another embodiment of the invention. The valve 350 includes a valve head 352 and a valve body 354. In the embodiment shown, the valve 350 is a shut off type valve disposed between a fuel source (not shown) and a fuel cell (not shown) as described above for FIG. 1. However, other types of valves can be used and can be disposed in other locations as desired. A flow path is formed in the valve 350 from an inlet port 356 formed in the valve body 354, into a valve chamber 357, through a gap between the valve head 352 and the valve body 354 when the valve head 352 is in an open position, and through an outlet port 358 formed in the valve body 354.

In the embodiment shown, the valve head 352 includes an insert 360 formed from a plastic, which is softer than a material used to form the valve body 354. However, it is understood that the insert 360 can be formed from other materials as desired. It is also understood that the insert 360 may be formed with the valve head 352, wherein the entire valve head 352 may be formed from a material which is softer than the material used to form the valve body 354. The valve head 352 includes an elastically deformable component 362 disposed in an annular cavity 363 formed therein. It is understood that additional elastically deformable components 362 and cavities 363 can be formed in the valve head 352 as desired, such as an annular array of elastically deformable components 352 and cavities 363, for example. It is also understood that a plurality of elastically transformable components 362 may be disposed in lesser number of cavities 363 without departing from the scope and spirit of the invention, such as wherein an annular array of elastically deformable components 362 is disposed in the ring shaped cavity 363, for example. In the embodiment shown, the elastically deformable component 362 is a metal spring. However, other types of elastically deformable components can be used as desired. The cavity 363 is in fluid communication with a plurality of pressure release bores 365 that are formed in the valve head 352. The pressure release bores 365 are in fluid communication with the valve chamber 357. It is understood that additional or fewer pressure release bores 365 may be formed in the valve head 352 as desired. The valve head 352 includes an annular tapered surface 361 that is adapted to abut the valve body 354. The valve head 352 is operably connected to an actuator (not shown) which selectively positions the valve head 352 in an open position as illustrated in FIG. 8 and a closed position as illustrated in FIG. 9.

The valve body 354 is formed from a material that is harder than the material used to form the insert 360, such as aluminum, for example. The valve body 354 includes an annular tapered surface 364, also known as a valve seat, around the outlet port 358. The annular tapered surface 364 is adapted to abut the annular tapered surface 361 of the insert 360 when the valve head 352 is in a closed position to create a substantially fluid tight seal therebetween.

A sealing member 366 is formed with the valve body 354 to form the valve chamber 357. The sealing member 366 shown is formed integrally with the valve body 354, but could be formed as a separate element, for example. A valve stem 368 disposed between the valve head 352 and the actuator extends through an aperture formed in the sealing member 366. It is understood that the valve stem 368 may be slidingly disposed in the aperture of the sealing member 366 if the sealing member 366 is stationary in respect of the valve body 354, or the valve stem 368 may be affixed to the sealing member 366 if the sealing member 366 is slidably received by the valve body 354. When the sealing member 366 is slidably received by the valve body 354, the sealing member 366, the valve stem 368, and the valve head 352 would all move together as a unit. It is further understood that other actuator types may be used which eliminate the need for the sealing member 366.

In use, when a flow of a fluid through the valve 350 is desired, the actuator positions the valve head 352 in an open position as illustrated in FIG. 8. It is understood that the actuator can position the valve head 352 in an open position by other means as desired, such as by adjusting the position of the valve body 354, for example. When the valve head 352 is in an open position, the fluid is permitted to flow into the inlet port 356, through the gap between the valve head 352 and the valve body 354, and out of the outlet port 358.

When it is desired to militate against the flow of fluid through the valve 350, the actuator positions the valve head 352 in a closed position as illustrated in FIG. 9. It is understood that the actuator can position the valve head 352 in a closed position by other means as desired, such as by adjusting the position of the valve body 354, for example. When the valve head 352 is in a closed position, the insert 360 abuts the tapered surface 364 of the valve body 354 to close the gap between the valve head 352 and the valve body 354, and the flow of the fluid is militated against. A force is exerted on the valve head 352 by the tapered surface 364 which causes the elastically deformable component 362 to deform. When the elastically deformable component 362 is deformed, fluid in the cavity 363 is caused to flow out through the pressure release bores 365 and into the valve chamber 357. When the valve head 352 is moved back into an open position, the force exerted on the valve head 352 is released, and the elastically deformable component 362 returns to its original position and shape, wherein the fluid flows back into the cavity 363 through the pressure release bores 365. A pressure exerted on the insert 360 by the deformable component 362 and the fluid when the valve head 352 is in the closed position militates against a plastic deformation of the insert 360.

While the elastically deformable component 362 has been shown as being disposed in the cavity 363 that is formed in the valve head 352, the elastically deformable component 362 may be disposed in a cavity (not shown) formed in the valve body 354 as desired without departing from the spirit and scope of the invention. It is understood that if the elastically deformable component 362 is disposed in a cavity formed in the valve body 354 rather than in the valve head 352, the valve body 354 would be formed from a material that is softer than the material used to form the valve head 352.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A valve comprising:
    a valve head adapted to be disposed in a chamber formed in the valve;
    a valve body having a valve seat formed thereon;
    an insert disposed on the valve head, the insert having an annular channel, wherein the insert is elastically deformed when the valve seat abuts the insert to create a substantially fluid tight seal therebetween;
    a pressure release bore formed in and through the valve head providing fluid communication between the annular channel and the chamber an elastically deformable component disposed in the annular channel; and
    wherein the elastically deformable component is a spring.

2. The valve according to claim 1, wherein the valve is disposed in a fuel cell system.

3. The valve according to claim 1, wherein the valve seat has a tapered surface adapted to abut a tapered surface of the insert.

4. The valve according to claim 1, wherein the valve seat has an annular lip adapted to abut the insert.

5. The valve according to claim 1, wherein the insert is formed from a material that is softer than a material used to form the valve body.

6. The valve according to claim 5, wherein the insert is formed from a plastic and the valve body is formed from a metal.

7. A valve for a fuel cell system comprising:
   a valve head adapted to be disposed in a chamber formed in the valve;
   a valve body having a valve seat formed thereon;
   an insert disposed on the valve head, the insert having an annular channel, wherein the insert is elastically deformed when the valve seats abuts the insert to create a substantially fluid tight seal therebetween;
   a pressure release bore formed in and through the valve head providing fluid communication between the annular channel and the chamber;
   an elastically deformable component disposed in the annular channel; and
   wherein the elastically deformable component is a spring.

8. The valve according to claim 7, wherein the valve seat has a tapered surface adapted to abut a tapered surface of the insert when the valve is in a closed position.

9. The valve according to claim 7, wherein the valve seat has an annular lip adapted to abut the insert when the valve is in a closed position.

10. A valve for a fuel cell system comprising:
    a valve head adapted to be disposed in a chamber formed in the valve;
    a valve body having a valve seat formed thereon;
    an insert disposed on the valve head, the insert having an annular channel, wherein the insert is elastically deformed when the valve seats abuts the insert to create a substantially fluid tight seal therebetween;
    a pressure release bore formed in and through the valve head providing fluid communication between the annular channel and the chamber;
    an elastically deformable component disposed in the annular channel, wherein the elastically deformable component is deformed when the valve is in a closed position and the valve seat abuts the insert; and
    wherein the elastically deformable component is a spring.

* * * * *